US008098030B2

(12) United States Patent
Theile et al.

(10) Patent No.: US 8,098,030 B2
(45) Date of Patent: Jan. 17, 2012

(54) DRIVE UNIT FOR A DOOR OR GATE, PARTICULARLY FOR A GARAGE DOOR, AND METHOD FOR OPERATING SUCH DRIVE UNIT

(75) Inventors: Ulrich Theile, Hagen (DE); Christian Dietz, Wipperfürth (DE)

(73) Assignee: Novoferm tormatic GmbH, Dortmund (DE)

( * ) Notice: Subject to any disclaimer, the term of this patent is extended or adjusted under 35 U.S.C. 154(b) by 424 days.

(21) Appl. No.: 12/468,426

(22) Filed: May 19, 2009

(65) Prior Publication Data

US 2009/0255188 A1 Oct. 15, 2009

Related U.S. Application Data

(62) Division of application No. 11/501,591, filed on Aug. 9, 2006.

(30) Foreign Application Priority Data

Aug. 18, 2005 (DE) ........................ 10 2005 039 532

(51) Int. Cl.
*H02P 7/00* (2006.01)
*G05B 19/10* (2006.01)
*G05B 15/00* (2006.01)

(52) U.S. Cl. ........ 318/265; 318/266; 318/466; 318/468; 318/567

(58) Field of Classification Search .................. 318/265, 318/266, 466, 468, 567
See application file for complete search history.

(56) References Cited

U.S. PATENT DOCUMENTS

| | | | | |
|---|---|---|---|---|
| 5,869,940 | A * | 2/1999 | Parsadayan | 318/461 |
| 6,400,112 | B1 * | 6/2002 | Fitzgibbon et al. | 318/445 |
| 2005/0269984 | A1 * | 12/2005 | Piechowiak et al. | 318/445 |
| 2006/0280523 | A1 * | 12/2006 | Sakai | 399/167 |

FOREIGN PATENT DOCUMENTS

| | | |
|---|---|---|
| DE | 43 37 828 | 5/1995 |
| DE | 196 44 056 | 4/1998 |
| DE | 199 18 414 | 11/2000 |
| EP | 0 500 984 | 9/1992 |

* cited by examiner

*Primary Examiner* — Thomas Dougherty
(74) *Attorney, Agent, or Firm* — Cozen O'Connor

(57) ABSTRACT

A drive unit for a door or a gate includes an electric motor, a detection unit for detecting the position of the door or gate, the detection unit being coupled to the motor and providing an identical pulse sequence with every rotation of the motor, wherein the duration of one pulse in the sequence is different from the duration of the other pulses in the sequence, which are equal. All detected pulses are stored in a non-volatile memory. The drive unit includes an electronic control and regulating circuit including an output stage for the electric motor and at least one memory, in which an operational program is stored providing a programmable learning procedure for an opening and closing movement of the door or gate based on the pulses provided by the detection unit.

16 Claims, 6 Drawing Sheets

DRIVE UNIT FOR A DOOR OR GATE, PARTICULARLY FOR A GARAGE DOOR, AND METHOD FOR OPERATING SUCH DRIVE UNIT

CROSS-REFERENCE TO RELATED APPLICATIONS

This application is a divisional of U.S. patent application Ser. No. 11/501,591 which was filed with the U.S. Patent and Trademark Office on Aug. 9, 2006 which claims priority from German Application No. 10 2005 039 532.5 filed Aug. 18, 2005. The entire disclosures of both of these applications are expressly incorporated herein by reference.

BACKGROUND OF THE INVENTION

1. Field of the Invention

The invention relates to a drive unit for a door or a gate, particularly a garage door, having an electric motor.

2. Description of the Related Art

EP 0 500 984 B1 describes a drive unit for a garage door, which is equipped with four terminal limit switches. In this case, the drive shaft protruding from the gear is provided with a pinion, which, on the one hand, drives the revolving chain and, on the other hand, is designed such that a bevel gear pinion simultaneously drives a terminal limit switch unit. In this case, the terminal limit switch unit is placed adjacent to the drive shaft and substantially consists of a threaded spindle which is equipped with adjusting nuts. The adjusting nuts are fixed by means of a holding device such that, while rotating the drive shaft, the spindle is rotated simultaneously and therefore the adjusting nuts are guided along the threaded spindle. Thus, they can trigger the corresponding electric contacts.

The position finding of the gate according to EP 0 500 984 B1 is realized exclusively at predetermined, precisely defined locations, preferably in the respective final positions via the corresponding terminal limit switches, which automatically turn the drive unit on and off. This means that, in terms of control, only this information regarding the predetermined positions are forwarded to the control unit. Any required intermediate positions can neither be detected nor controlled, such that there is no possibility for manipulating the sequence of movements of the gate, because the adjustment of the position of the terminal limit switches can only be done manually.

There are many different types of drive units for a door or a gate available on the market. They particularly differ from each other by the different performance data thereof, i.e. there are variably powerful drive units for large or small doors and gates. These drive units must be equipped with different safety devices, such as light barriers or terminal strips or a power limit control for the drive motor, etc. As a rule, a maximum driving force is mandatory, to prevent people from being injured and equipment from being damaged. This leads, however, to a large variety of different drive units, which is not only complicated and costly from the manufacturing point of view, but also for stock keeping and logistics. Hence, in extreme cases, this may lead to circumstances where it is difficult to figure out the appropriate drive unit, whereby even unsuitable decisions may be made and may in turn lead to further increasing costs and loss of time.

SUMMARY OF THE INVENTION

The object of the invention is to provide a cost effective, universally applicable drive unit for many different door and gate types while employing a minimum of hardware and simultaneously offering a maximum degree of safety for people and objects. It is a further object to reduce costs of commissioning such drive unit and likewise to prevent errors, while achieving a quick and exact commissioning. It is moreover intended to reduce manufacturing expenses and to minimize the dimensions.

The invention offers a particularly successful combination of various hardware components in conjunction with a control and regulating circuit, whereby various operational programs, being both manually and automatically modifiable, can be memorized in non-volatile memories of the control and regulating circuit.

With the inventive drive unit it is possible for the first time to completely detect the overall sequence of movements of a door or a gate to centrally record the data in a memory and to further process these data. In this case, it is possible to control different parameters and to manipulate them. At any given time it is possible to determine the absolute position of the door and, for example, to manipulate the speed; it is likewise possible to detect the angle of rotation. The drive unit comprises a detection unit and an electronic control and regulation unit. The detection unit consists in this case of an information carrier and of a sampling system.

Several information elements are formed about the circumference of the information carrier, wherein a unique recognition of a complete rotation of the information carrier is possible either by providing one unequal distance between two information elements or by the presence of one information element differing from the other ones. Additionally, the detected data can be used to realize comfort features. Furthermore, said position detection reliably guarantees an appropriate start-up or a continuation of a sequence of movements even if a brief disturbance or interruption has occurred.

Thanks to the inventive solution, mechanical terminal limit switches are no longer required, since the positions are programmed and reliably detected by the detection unit. Obviously, other parameters and functions, such as opening speed, opening duration, closing speed, closing duration, etc., are simplified by processing the corresponding data in the control and regulating unit.

The information carrier supplies the unique information element about a completed rotation. Therefore, it is possible to exactly specify the precise position of the gate in both rotational directions through this discontinuity, according to a program which will be described later. It should be mentioned at this point that in the following description reference is made generally to a gate, however, the invention is likewise applicable to doors and particularly to garage doors.

Fundamentally, the operational principle of the detection unit is thus based on the fact that a pulse is generated during every rotation which has a different length of time compared to the other pulses generated during that rotation. Thus, the determination of the number of rotations can be achieved, for example, via the respective valid edge depending on the direction of rotation. Within a speed tolerance to be specified, the pulse having a different length of time is being detected through a filter. The determined pulse is compared with the current position and is corrected, if necessary. By cyclically recording the position in a non-volatile memory at least once per rotation, it is possible to detect the precise position again, even after a voltage break-down. The procedure to detect the overall traversed distance will be described in the following.

Such above described detection unit can be realized, for example, by an incremental sensor. The fundamental structure consists substantially of a light barrier incorporated in an electronic circuit and of an information carrier in operational connection with the light barrier. This information carrier can be fixed, for example, directly on the drive shaft of the drive motor. Such drive shaft can protrude, for example, from both sides of the gear, which is connected to the drive motor via flanges, and can thus serve to accommodate the information carrier. The incremental sensor together with the electronic control thereof can be designed as an exchangeable module.

The embodiment of the information carrier can have various forms; however, disk-shaped, annular or cup-shaped embodiments are preferred. The information elements required for determining the position are provided on the circumference of the information carrier. These information elements may be spaced apart portions or elements projecting in the same plane or perpendicular to the plane of the information carrier. Teeth, being spaced apart by grooves, have proven to be particularly effective. Other embodiments are likewise possible, if they are capable of providing signals which can be unambiguously detected.

The electronic circuit itself being connected to the detection unit, or the control and regulating circuit of the drive unit are able to process the transmitted information according to different programs. For example, one program is provided, which is particularly adapted to learn the various positions. This can be achieved by selectively actuating push-buttons, directly at the drive unit or via a remote control. Thus, the drive unit will first learn, via the incremental sensor, a position "gate open", which is memorized in a non-volatile memory. Then, the position "gate closed" will be approached and is again memorized in the non-volatile memory. The detected reference pulses, i.e. the pulses which are generated due to the different displacement relative to the other pulses per rotation, are measured and filtered in a pulse-time measurement. The filtered-out reference pulses are then memorized separately in addition to the other equal pulses for the purpose of a pulse comparison value.

During the subsequent operation, upon starting the drive unit, all equal pulses and all reference pulses are measured and compared with the previously measured reference values. If, during this measurement, a difference is identified between these two values, the current counter is automatically corrected to the pulse comparison value.

Through this approach, a particularly cost effective solution for door and gate drives offering highest safety levels has been found. Thus, in addition to detecting final positions, speed control, travel and deceleration ramps, and other travel features can be provided at little expense through corresponding programming.

Another program aiming to further increase the safety potential for individuals using a gate is provided, which includes a process being used to control the drive. Such process is likewise intended to reduce the use of hardware. In this case, the opening and closing parameters of the gate are precisely detected. By establishing three particular positions of the gate, it is possible to precisely define the final positions—open position and closed position—and the direction in which the gate is travelling. Such drive unit is mounted independently from the direction of movement. The self-learning detection of the opening and closing directions and/or of the parameters depending upon these indications is realized on-site during commissioning once the drive unit is mounted. However, for standardized drive units with predetermined gates, it is possible to realize said learning already during manufacturing. Furthermore, the learning procedure can be combined with learning of other important parameters of the gate. Thus, during a first start-up, a combination with the above described process regarding the learning procedure of the total travel path by the special incremental sensor may be possible. It should be noted, that approaching the final points of the travel path can be realized by manually displacing the gate. Furthermore, it is possible to just realize a partial opening distance.

Another modifiable program can be activated to detect and adjust the forces at the main closing edge and the secondary closing edges. Thus, power limit control means are provided, the data of which being processed in the drive unit. Therefore, advantageously various hardware embodiments, such as a phase-angle control, a controllable voltage source or power source, a current regulator or voltage regulator, or even a pole-changing motor winding can be used, which are always manipulated by a modifiable memorized program. Such realization can achieve a power limit control by checking corresponding safety devices in the event of an imminent power excess, or if a power limit is actually exceeded. Such detection can be transmitted to the drive shaft of the drive unit by means of hardware or software. Moreover, by extending the associated program, it is possible to realize a variety of different safety levels. This can be achieved with or without additional safety devices.

For such drive unit of the above described type the drive motor may provide enough power that it can drive even large gates without any problem. Only through the additional use of safety means, which are unambiguously and automatically recognized when being connected to the drive unit, an intended power limit control is initiated at the main closing edge and the secondary closing edges of the gate in conjunction with a certain program. Thus, on account of the application cases that have been memorized, different driving forces or driving torques can be supplied adapted to the value allowed in view of safety aspects. All known devices can be considered as safety devices. This includes also safety devices which transmit corresponding signals to the drive unit by wireless transmission.

Moreover, the scope of the invention includes such applications where no additional safety devices are being used. These could be programmed opening and closing runs of the door or of the gate, which for example are only realized through a program or through the parameters and data that have been determined during commissioning and are recorded and processed in appropriate programs. After the first test run during commissioning, the program choice can be selected manually or automatically. With the intention to achieve an unambiguous assignment of the individual power programs, it is necessary, in addition to the detected force values along the overall traveled distance, to allow for certain admissible tolerances, which can be likewise programmed, virtually in the form of an envelope above and below the detected value. Therefore, even after a prolonged operating time of the gate, reliably safe operation is still possible. Differences compared to the actual value may arise e.g. through friction which occurs later.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
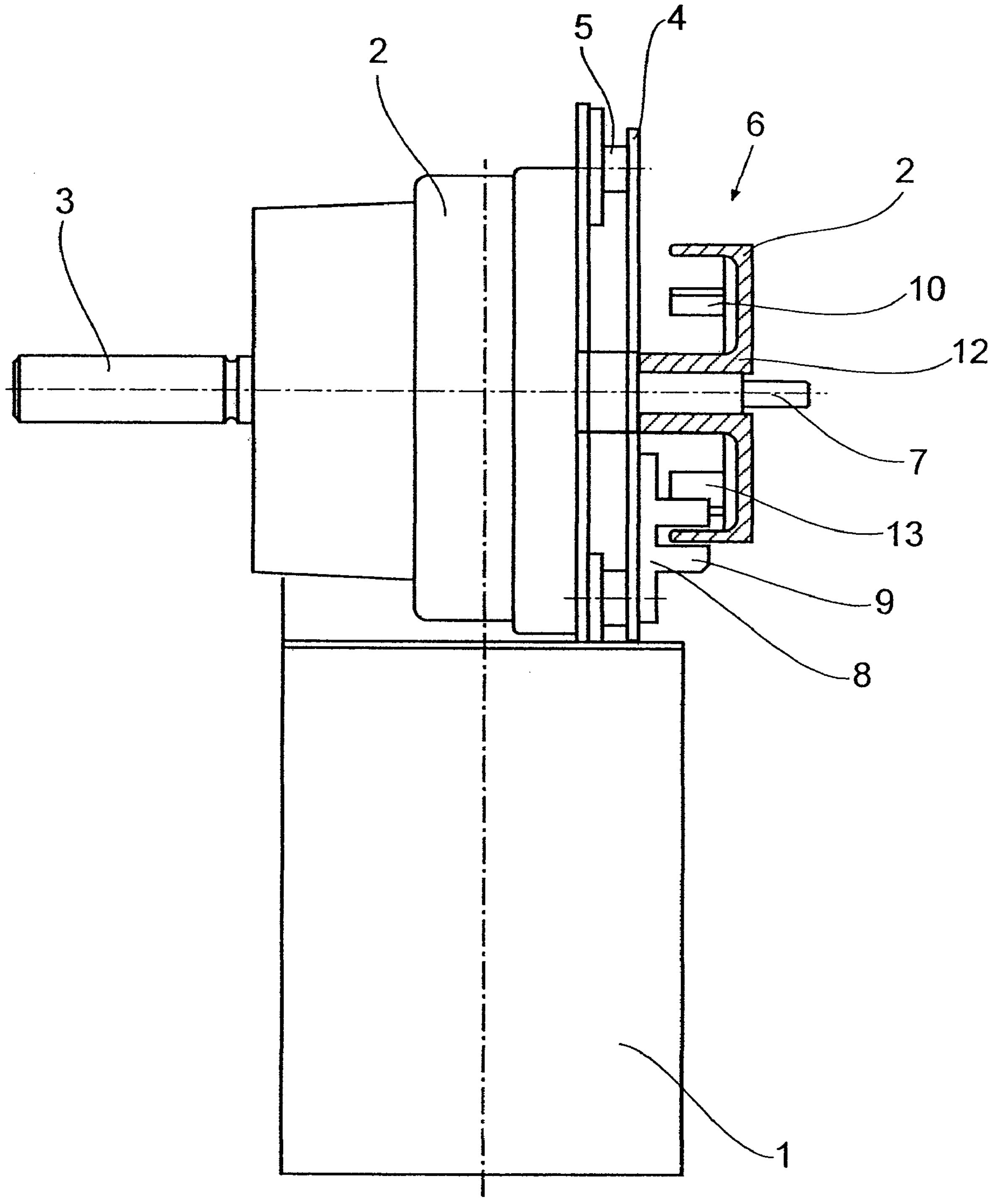
FIG. 1 shows a drive motor including an incremental sensor.

A drive unit is depicted in FIG. 1, which comprises a drive motor 1, which is connected to a gear 2 which includes a drive shaft being equipped with two opposed drive shaft ends 3, 7. The drive shaft end 3 serves for driving a non-illustrated pinion or drive wheel, and the drive shaft end 7 is directly connected to an information carrier 6. The embodiment of FIG. 1, where the drive shaft ends 3 and 7 are provided on each side of the gear 2 and are not extending in axial direction of the drive motor 1, is not mandatory. Instead, any other suitable arrangement can be chosen.

The information carrier 6 is formed as a bell or cup, and information elements 10 to 17 are distributed about the circumference thereof projecting from a bottom of the information carrier 6. These information elements 10 to 17 cooperate with a sampling system 8 in the form of a fork-shaped light barrier, such that the information elements 10 to 17 pass between the two legs 9 of the sampling system 8 which are spaced apart. The sampling system 8 is located on a printed circuit board 4 containing the complete evaluation circuits of the information carrier 6. Thus, in the event the evaluation circuits should malfunction, quick removal is possible from the gear 2, on or at which the printed circuit board 4 is fixed via mounts 5. The information carrier 6 is detachably fixed to the drive shaft end 7 and is thus easy to remove and to exchange.

Figure 2:
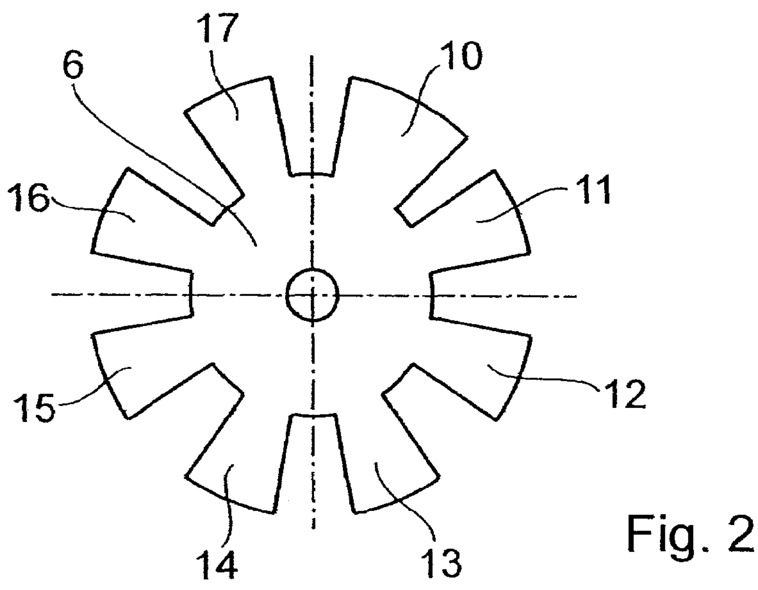
FIG. 2 is a plan view on an information carrier.
Figure 3:
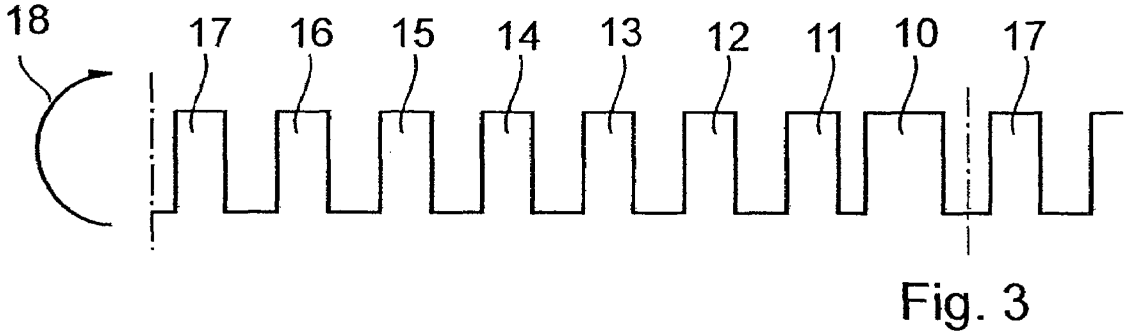
FIG. 3 is a timing diagram of a complete rotation of the information carrier of FIG. 2, FIG. 4 corresponds to FIG. 3, but shows the opposite direction of rotation.
Figure 4:
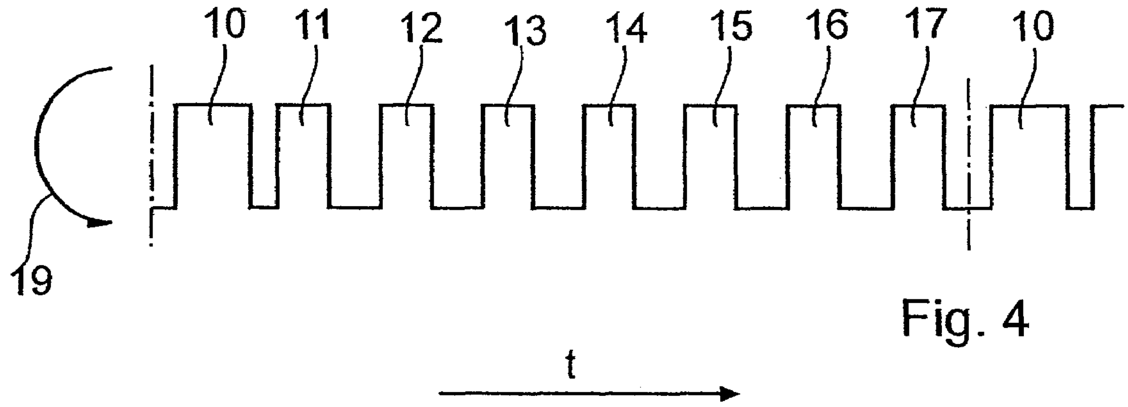
Figure 5:
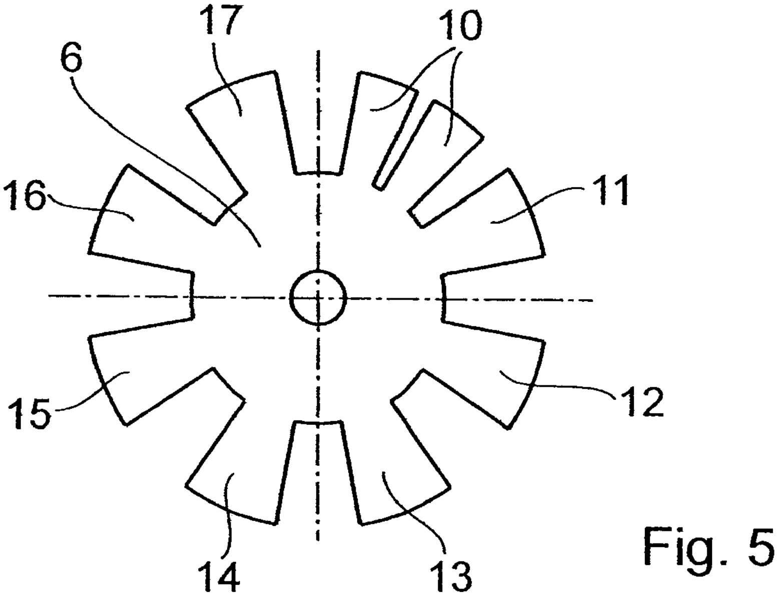
FIG. 5 is a plan view of another embodiment of an information carrier.

The information carrier 6 comprises evenly spaced and regularly shaped information elements 11 to 17 and one unevenly spaced and irregularly shaped information element 10. FIGS. 2 and 5 show two different disk-shaped information carriers 6. The information elements 10 to 17 extend in this case in the same plane. The information carrier of FIG. 2 is equipped with information elements 11 to 17 which are illustrated as regularly shaped and spaced apart at equal distance. The information element 10 is larger dimensioned and presents a smaller distance towards information element 11. This irregularity generates a pulse within the sampling system 8 which has a different length of time than the pulses which are generated by the information elements 11 to 17. A time sequence t of one rotation of information carrier 6 according to FIG. 2 is shown in FIGS. 3 and 4 for a rotation to the right 18 and to the left 19.

Figure 6:
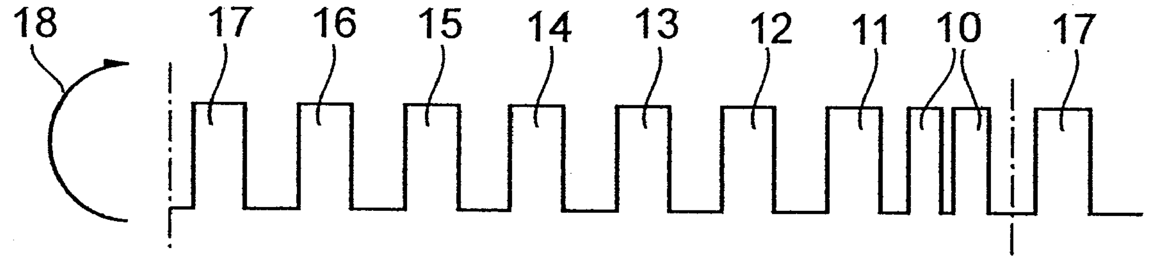
FIG. 6 is a timing diagram of a complete rotation of the information carrier of FIG. 5, FIG. 7 corresponds to FIG. 6, but shows the opposite direction of rotation.
Figure 7:
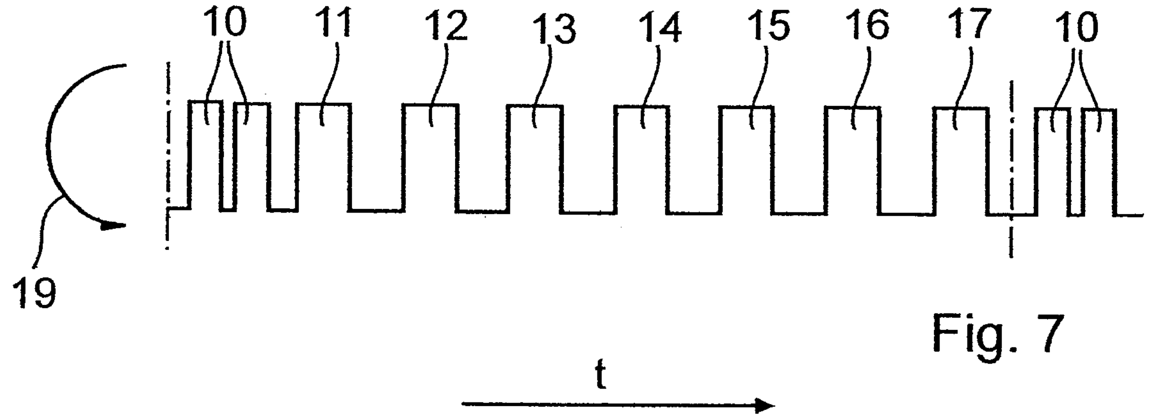

The information carrier 6 of FIG. 5 likewise comprises information elements 11 to 17 that are regularly shaped and spaced apart at equal distance. The information element 10 is divided into two smaller segments of equal size and presents a smaller distance towards the information element 11. Using information elements with such design, the sampling system 8 with the electronic circuit will likewise unambiguously detect one rotation of the information carrier 6. This time sequence of one rotation to the right is illustrated in FIG. 6 and of a rotation to the left in FIG. 7.

Figure 8:
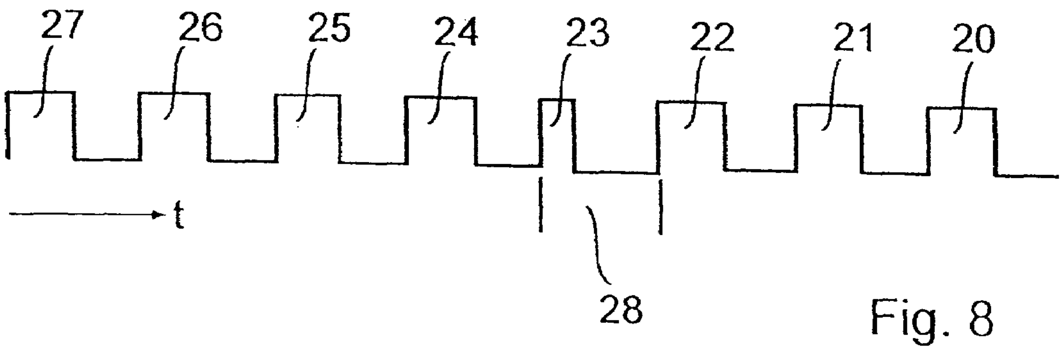
FIG. 8 shows a timing diagram of the signals provided by an information carrier with information elements.

FIG. 8 represents the pulses 20 to 27 generated in the electronic device in the direction "gate open". The length of time of the pulses 20, 21, 22, 24, 25, 26 and 27 is identical. The pulse 23 is shorter and is thus used as a reference pulse 28 to count the rotations of the gear 2 with the drive motor 1 along the overall length of run of the gate. It is obvious that, with such an information carrier 6, the drive element 55 will exactly know the current location of the gate, even if the drive has been switched off temporarily.

Figure 9:
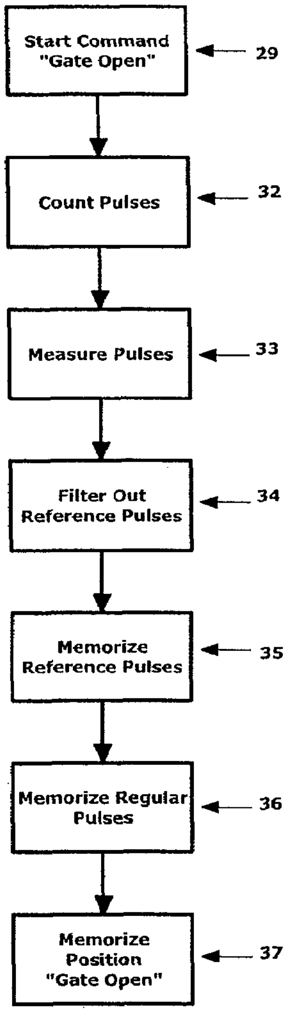
FIG. 9 is a flow diagram for learning the final position "gate open" of the connected door or gate.
Figure 10:
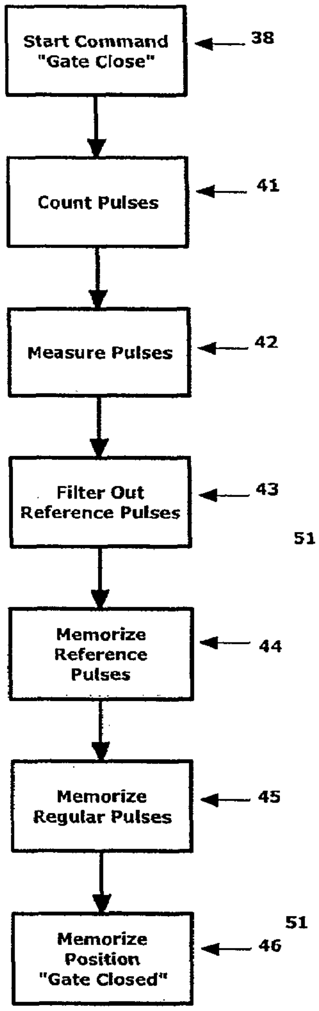
FIG. 10 is a flow diagram for learning the final position "gate closed" of the connected door or gate.

However, to provide the information carrier 6 with the ability to learn the final positions of the gate, a learning program, which is activated during the initial operation, is provided in the drive element 55. FIG. 9 depicts one possible program sequence. A closed gate (not shown) receives the start command "gate open" 29 from the learning program, e.g. by someone pushing a button on a remote control. The gate opens with low speed. In step 32, a counter counts the pulses 20 to 27 transmitted by the information carrier 6. Then, at the next step 33, a measurement of the length of pulses 20 to 27 is performed. At program step 34, the reference pulses 28 having the different length are being determined among the detected pulses 20 to 27. All detected pulses 20 to 27 having identical content and the reference pulses 28 are then memorized in a non-volatile memory in steps 35 and 36, while simultaneously the detected position "gate open" is memorized in a memory (step 37).

For safety purposes, after detecting the travel distance for "gate open", the learning of the direction "gate close" is likewise performed and memorized. This procedure is virtually performed in reversed order with regard to the determination of the first travel distance. On account of a start command "gate close" 38, the gate starts to move and the pulses 20 to 27 are counted at step 41 and measured at step 42. At step 43, the reference pulses 28 are filtered out and memorized at 44, whereas at 45 all pulses 20 to 27 are being memorized. When the position "gate closed" is reached, said position is reliably memorized at program step 46.

The reference pulses 28 allow for performing very precise position detection. By permanently memorizing the position in a non-volatile memory at least once per rotation of the information carrier 6, the precise position can be determined again, even after a voltage break-down.

Figure 11:
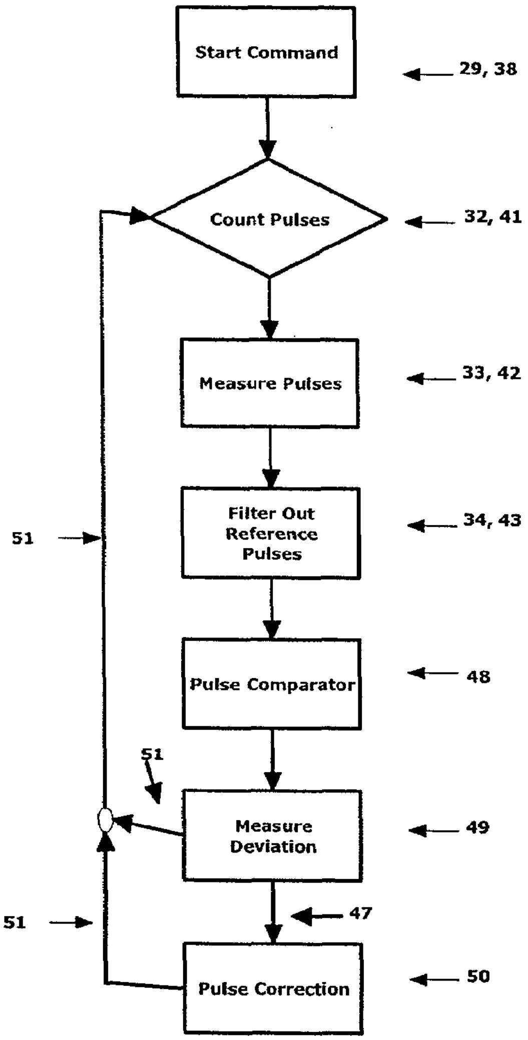
FIG. 11 is a flow diagram for the operation of the connected door or gate.

The flow diagram of FIG. 11 shows the program sequence for operating the drive element 55. If the command "gate open" 29 is selected, due to the rotational movement of the information carrier 6 the pulses 20 to 27 are counted at step 32. At step 33 the length of time of these pulses is measured and at step 34 the reference pulses 28 are filtered out (and then memorized). Subsequently, a comparison of the current pulses 20 to 27 with pulses detected during the learning run is performed in a pulse comparator 48, each time a reference pulse 28 is received. During a subsequent pulse deviation measurement 49 it is established if there is a deviation from the learned and memorized pulses or not. If no deviation is found, further measurement of pulses is performed by returning to step 32 via a command 51. However, if a deviation is found, a correction of the pulses will be realized through a command 47 for a correction comparison in pulse correction step 50, and said correction is then returned to step 32 via the command 51 for further measurement of pulses, such that the further pulses 20 to 27 are detected and measured in a new cycle (the rotations of the information carrier 6). Thus, one rotation of the information carrier 6 follows another rotation until the overall determined travel distance needed to open the gate has been traversed, and the drive motor 1 is switched off when the correct opening position is reached.

For closing the gate, the program sequence of FIG. 11 will be started through a start command "gate close" 38. At step 41 the pulses 20 to 27 will then be counted again, however in the opposite direction of rotation of the information carrier 6. At step 42 the length of time of these pulses is measured and checked and at step 43 the reference pulses 28 per rotation of the information carrier 6 are filtered out (and then memorized). Then the program proceeds via the steps 48, 49 and 50 for this direction of travel in the same way as described above for the direction "gate open".

Figure 13:
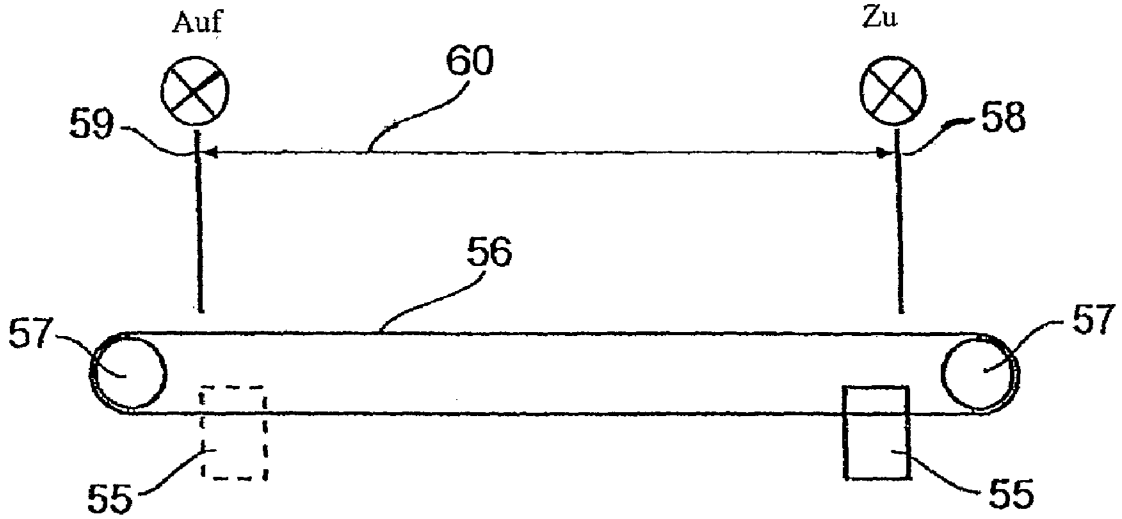
FIG. 13 is a diagrammatic illustration for determining a travel distance.

In order to increase the safety potential, the drive element 55 comprises another program for operating the drive motor 1, which detects a programmed learning procedure for the opening and closing directions of the gate and the associated depending parameters in a self-learning manner. The detected parameters are automatically memorized in a non-volatile memory and are automatically retrieved during operation of the gate. If the gate is, for example, manually displaced and both final positions "gate open" and "gate closed" are detected, the final positions of the movement of the gate can thus be easily obtained with only limited use of hardware. However, a motorized run to the final positions of the gate is likewise possible. However, when performing manual displacement, the drive unit can be mounted independently. When determining the final positions, in the position "gate closed", the gate is moved against a limit stop of a lock, and in the position "gate open", it is preferably moved against a limit stop at the end of the roller rail. A drive element 55 is connected to a toothed belt 56 which is endlessly guided via two deflection rollers 57 that are spaced apart. For example, the drive element 55 can be moved from the position "gate closed" 58 until it reaches a limit stop, which is not shown in FIG. 13, and therefore reaches the position "gate open" 59. The distance 60 between the two final positions corresponds to the travel distance and is automatically memorized.

The learning procedure can also preferably be initiated via a learning push-button. Such learning push-button could also activate several learning procedures and thus start several sub-routines, which are important to determine the travel distance and the required parameters, e.g. the door weight, the door type, the door width, etc. Besides determining the travel distance 60 via the information carrier 6, such program will achieve double safety. It is to be noted that individual programs can also be used or activated only optionally.

Figure 14:
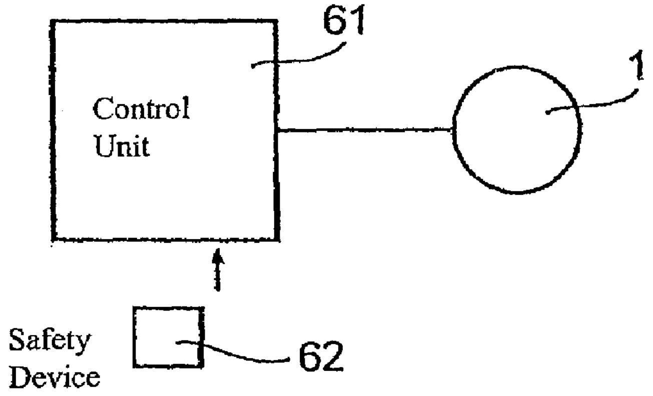
FIG. 14 is a block diagram of a regulation with additional limit control means.

By using a more powerful motor, the drive motor 1 could be universally used for any gate type. For this purpose, the control and regulation unit 61 can be provided with an additional safety device 62, as illustrated, for example, in FIG. 14. The additional safety device 62 can be formed in a pluggable manner, with the intention to reduce the driving power of the drive motor 1 such that it is adapted to the connected gate. This will allow for having different safety devices 62 in stock, which are adapted to different types and sizes of gates, thus enabling to reduce the driving force or the driving torque in such a way that there will be no risk for people or material. When formed as a plug, the safety device 62 can be implemented by electronic, magnetic or mechanical encoding.

The safety device 62 can, for example, be formed as a phase-angle control, a controllable power source, a voltage regulator, a current regulator, or a pole-changing motor winding. Such a safety device 62 can be realized by circuitry or by activating a corresponding program. It is understood that also several safety devices 62 can be employed simultaneously.

At the same time, a safety device 62 can likewise achieve an increase in the driving force of the drive motor 1. The drive unit automatically recognizes which safety device 62 is provided. This can be done wirelessly, in which case the safety device 62 automatically transmits the corresponding encoding to the drive motor 1, which recognizes the safety device 62 and thus, depending thereon, adjusts the driving force or driving torque to a higher or lower level.

Figure 12:
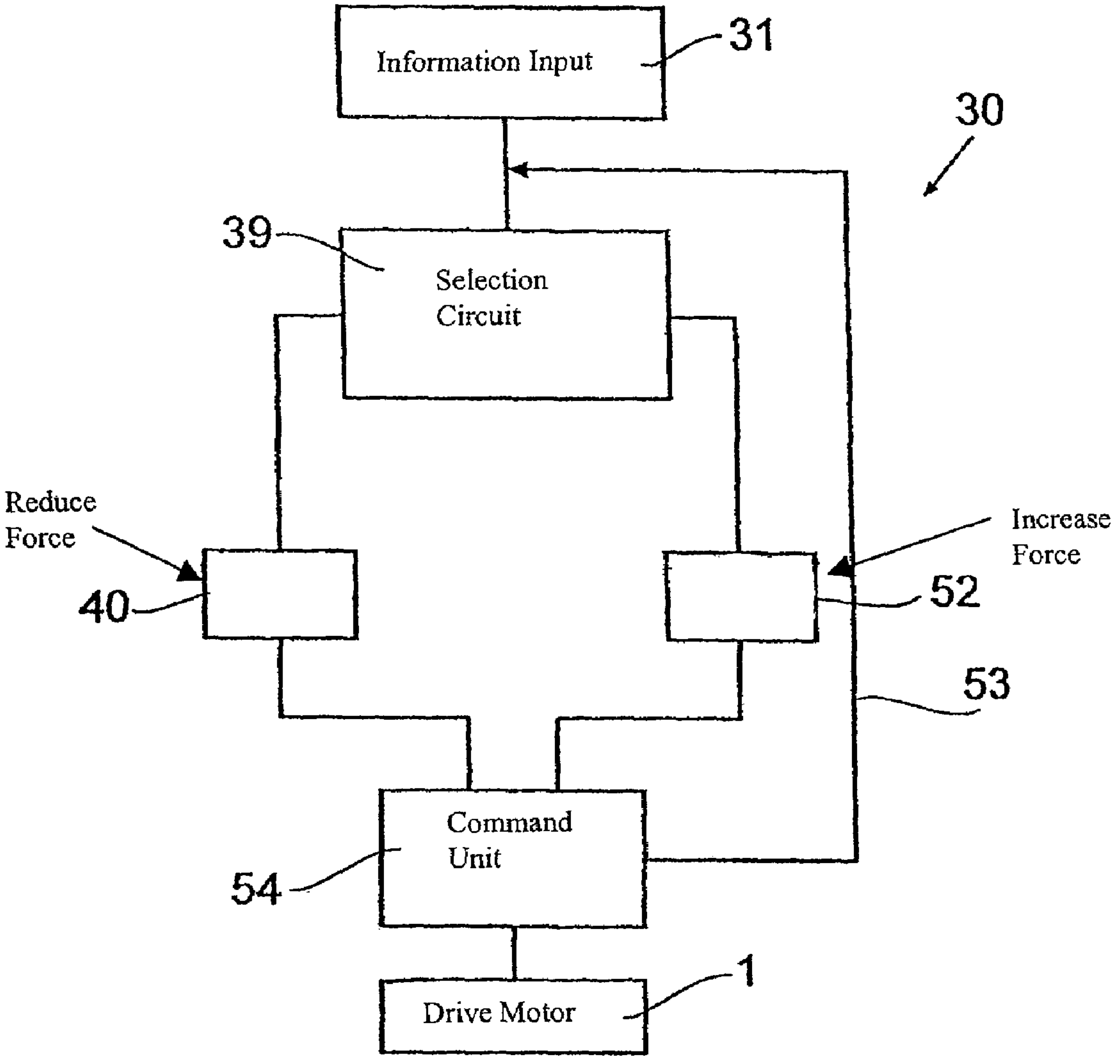
FIG. 12 is a flow diagram for the power limit control.

Furthermore, for increasing the safety potential, a programmable, progressively adaptable matching for power transfer 30 is provided, which is illustrated in FIG. 12. The matching for power transfer 30 is activated by an information input 31, which can be done via a program or can be entered manually. The input command is directed to a selection circuit 39, where a comparison between the input values and the memorized values is made. If the driving force or the driving torque of the drive motor 1 is to be reduced, a program for a reduced driving force 40 is activated, and the output is transmitted to a command unit 54 which forwards the desired driving force to the drive motor 1, where the program is executed. If the driving force or the driving torque is to be increased, the selection circuit 39 selects a program for an increased driving force 52, and the output is likewise forwarded to the command unit 54 for changing the driving force. If the desired driving force or driving torque is not reached in the drive motor 1, this information, via a return message 53, is sent to the selection circuit 39, where a corresponding correction is made.

The invention is not limited by the embodiments described above which are presented as examples only but can be modified in various ways within the scope of protection defined by the appended patent claims.

What is claimed is:

1. A method of operating a drive unit for a door or a gate, said drive unit comprising an electric motor, a detection unit for detecting the position of said door or gate, said detection unit being coupled to said motor and providing an identical pulse sequence with every rotation of said motor, wherein the duration of one of the pulses in said sequence is different from the duration of the other pulses in said sequence which have the same duration, a non-volatile memory in which all detected pulses are stored, and an electronic control and regulating circuit including an output stage for the electric motor and at least one memory, in which an operational program is stored, said program providing a programmable learning procedure for an opening and closing movement of said door or gate based on said pulses provided by said detection unit, said program for a programmable learning procedure for an opening and closing movement of the door or gate comprising the steps of:

detecting data regarding a first sequence of movement along an overall travel distance between final points "gate closed" and "gate open" of the movement of said door or gate in said detection unit, and memorizing said data regarding said first sequence of movement in said non-volatile memory.

2. The method of operating a drive unit according to claim 1, wherein parameters for said final points "gate closed" and "gate open" are detected in a self-learning manner from said travel distance and are memorized.

3. The method of operating a drive unit according to claim 1, wherein said overall travel distance is traversed by automatically applying a motive force or by manually displacing said door or gate.

4. The method of operating a drive unit according to claim 1, wherein said data detected by said detection unit are sampled in form of pulses and are memorized in said non-volatile memory.

5. The method of operating a drive unit according to claim 4, wherein various programs are executed simultaneously or in a time-shifted manner.

6. The method of operating a drive unit according to claim 4, wherein reference data in form of reference pulses are being filtered out from the detected data.

7. The method of operating a drive unit according to claim 6, wherein said detected reference pulses are being filtered out via a program for pulse time measurement.

8. The method of operating a drive unit according to claim 6, wherein pulse comparison values are detected from said detected reference pulses and are memorized.

9. The method of operating a drive unit according to claim 1, wherein said detected data memorized in said non-volatile memory are fed to a pulse counter.

10. The method of operating a drive unit according to claim 1, wherein during a first start-up of said drive unit the following learning program is automatically executed:

automatically approaching a selected position "gate open" or "gate closed",
memorizing a first detected position,
automatically approaching an opposite position,
memorizing a second detected position,
simultaneously counting pulses of the detection unit and measuring their length of time,
filtering out reference pulses from the pulses,
memorizing said reference pulses and the total number of pulses in a non-volatile memory;
detecting pulse comparison values from the reference pulses and memorizing same.

11. The method of operating a drive unit according to claim 1, wherein the following program is executed during operation of the door or gate:

starting said drive unit by use of a signal,
counting the total pulses with said detection unit,
measuring the length of time of each pulse,
filtering out reference pulses, memorizing same and comparing same with pulse comparison values,
comparing current pulses with said memorized pulses,
performing a correction of the pulses, if there is a deviation.

12. The method of operating a drive unit according to claim 1, wherein a programmable program for power measurement or power adjustment at a main closing edge or secondary closing edges of said door or gate provides for a programmable variable power limit control.

13. The method of operating a drive unit according to claim 12, wherein said power limit control is automatically set to different values, if said door or gate does not include additional safety devices.

14. The method of operating a drive unit according to claim 13, wherein said value of said power limit control is transmitted to said drive unit and is memorized.

15. The method of operating a drive unit according to claim 12, wherein said power limit control provides for different values along said overall travel distance of said door or gate.

16. The method of operating a drive unit according to claim 12, wherein an adjustment of a driving force or driving torque of said drive unit is executed automatically by a programmable matching for power transfer.

* * * * *